US011354199B2

(12) United States Patent
Basu et al.

(10) Patent No.: US 11,354,199 B2
(45) Date of Patent: *Jun. 7, 2022

(54) BYZANTINE FAULT TOLERANCE WITH VERIFIABLE SECRET SHARING AT CONSTANT OVERHEAD

(71) Applicant: VMware, Inc., Palo Alto, CA (US)

(72) Inventors: Soumya Basu, Ithaca, NY (US); Alin Tomescu, Cambridge, MA (US); Dahlia Malkhi, Palo Alto, CA (US); Michael Reiter, Palo Alto, CA (US); Adrian Seredinschi, Lausanne (CH); Ittai Abraham, Tel Aviv (IL); Guy Golan Gueta, Holong (IL)

(73) Assignee: VMware, Inc., Palo Alto, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/740,315

(22) Filed: Jan. 10, 2020

(65) Prior Publication Data
US 2020/0151066 A1 May 14, 2020

Related U.S. Application Data

(63) Continuation of application No. 15/729,568, filed on Nov. 1, 2017, now Pat. No. 10,572,352.

(51) Int. Cl.
*G06F 11/14* (2006.01)
*H04L 9/08* (2006.01)

(52) U.S. Cl.
CPC .......... *G06F 11/1469* (2013.01); *H04L 9/085* (2013.01); *H04L 9/0869* (2013.01);
(Continued)

(58) Field of Classification Search
CPC .. G06F 11/14; G06F 11/1469; G06F 11/2094; G06F 2201/805
See application file for complete search history.

(56) References Cited

U.S. PATENT DOCUMENTS

| 6,671,821 B1 * | 12/2003 | Castro | G06F 21/577 |
| | | | 714/4.3 |
| 8,132,073 B1 * | 3/2012 | Bowers | H04L 9/3271 |
| | | | 714/755 |

(Continued)

OTHER PUBLICATIONS

Michael Backes et al, "Asynchronous Computational VSS with Reduced Communication Complexity", Proceedings of the 13th International Conference on Topics in Cryptology, 20 pages, Feb. 25, 2013, San Francisco, CA.

(Continued)

*Primary Examiner* — Kamini B Patel

(57) ABSTRACT

Techniques for implementing Byzantine fault tolerance with verifiable secret sharing at constant overhead are provided. In one set of embodiments, a client can determine a secret value s to be shared with N replicas in a distributed system, s being input data for a service operation provided by the N replicas. The client can further encode s into an f-degree polynomial P(x) where f corresponds to a maximum number of faulty replicas in the distributed system, evaluate P(x) at i for i=1 to N resulting in N evaluations P(i), generate at least one f-degree recovery polynomial R(x) based on a distributed pseudo-random function (DPRF) $f_\alpha(x)$, and evaluate R(x) at i for i=1 to N resulting in at least N evaluations R(i). The client can then invoke the service operation, the invoking comprising transmitting a message including P(i) and R(i) to each respective replica i.

21 Claims, 7 Drawing Sheets

(52) U.S. Cl.
CPC ...... *H04L 9/0894* (2013.01); *G06F 2201/805* (2013.01); *G06F 2201/82* (2013.01)

(56) References Cited

U.S. PATENT DOCUMENTS

| | | | | |
|---|---|---|---|---|
| 2004/0254967 | A1* | 12/2004 | Cachin | H04L 9/302 |
| | | | | 708/250 |
| 2010/0037056 | A1* | 2/2010 | Follis | H04L 9/3271 |
| | | | | 713/171 |
| 2010/0092470 | A1* | 4/2010 | Bhatt | C07K 16/00 |
| | | | | 435/69.6 |
| 2011/0029590 | A1* | 2/2011 | Bailey | G06F 11/004 |
| | | | | 709/202 |
| 2011/0179082 | A1* | 7/2011 | Vaghani | G06F 16/1774 |
| | | | | 707/781 |
| 2015/0023498 | A1* | 1/2015 | Asim | H04L 9/3073 |
| | | | | 380/44 |
| 2017/0289274 | A1* | 10/2017 | Levy | H04W 48/16 |
| 2018/0157558 | A1* | 6/2018 | Karame | G06F 11/1451 |
| 2019/0097790 | A1* | 3/2019 | Li | H04L 9/085 |
| 2020/0127945 | A1* | 4/2020 | Yang | H04L 9/3239 |
| 2020/0192770 | A1* | 6/2020 | Walid | G06Q 20/401 |

OTHER PUBLICATIONS

Aniket Kate et al., "Polynomial Commitments", CACR 2010 Cybersecurity Summit, 25 pages, Dec. 1, 2010.

Guy Zyskind et al., "Enigma: Decentralized Computation Platform with Guaranteed Privacy", Cornell University, Jun. 10, 2015, 14 pages.

Paul Feldman, "A Practical Scheme for Non-interactive Verifiable Secret Sharing", Massachusetts Institute of Technology, 11 pages, downloaded Feb. 23, 2010.

Moni Naor et al., "Distributed Pseudo-Random Functions and KDCs", EUROCRYPT'99 Proceedings of the 17th International Conferene on Theory and Application of Cryptographic Techniques, 20 pages, May 2-6, 1999.

Miguel Castro et al., "Practical Byzantine Fault Tolerance", Proceedings of the Third Symposium on Operating Systems Design and Implementation, 14 pages, Feb. 1999, New Orleans, USA.

* cited by examiner

BYZANTINE FAULT TOLERANCE WITH VERIFIABLE SECRET SHARING AT CONSTANT OVERHEAD

CROSS REFERENCE TO RELATED APPLICATION

This application is a continuation application and pursuant to 35 U.S.C. § 120 is entitled to and claims the benefit of earlier filed application U.S. application Ser. No. 15/729,568, filed Nov. 1, 2017, now U.S. Pat. No. 10,572,352, issued Feb. 25, 2020, the content of which is incorporated herein by reference in its entirety for all purposes.

BACKGROUND

Unless specifically indicated herein, the approaches described in this section should not be construed as prior art to the claims of the present application and are not admitted to be prior art by inclusion in this section.

Byzantine fault tolerant (BFT) protocols are commonly used in distributed systems that provide replicated services (i.e., services whose operations and state are mirrored on each system node, referred to as a "replica") to provide resilience against arbitrary failures that prevent replicas from reaching consensus on matters critical to their correct operation. For example, in a distributed system that comprises N total replicas, the system will typically employ a BFT protocol to ensure that when replicas 1 . . . N receive client requests to perform service operations, the non-faulty replicas will sequence execution of the service operations in an identical manner. Generally speaking, N must be greater than or equal to 3f+1 (where f is the maximum number of faulty replicas) in order for the BFT protocol to guarantee that all non-faulty replicas agree on the same sequence number for each service operation (referred to as "safety"), and that every service operation will eventually be assigned a sequence number given the synchrony assumptions of the protocol (referred to as "liveness").

In some distributed systems that use BFT, there is a need for at least a portion of the state handled/maintained by each replica to be hidden (i.e., kept secret) from that individual replica and any group of f replicas, but capable of being revealed (i.e., reconstructed) by f+1 replicas in response to an explicit request. For instance, if the replicated service provided by a distributed system is a data storage service, the client or some other entity may want a portion of each data entry persisted via the data storage service to be private. By keeping this private data secret from any group of f replicas, an adversary that takes over those replicas cannot learn the content of the data. At the same time, by enabling a quorum of f+1 replicas to reconstruct the secret, the system as a whole can remain in control of its data and thus can implement features that rely on such control.

There is a class of cryptographic algorithms known as verifiable secret sharing (VSS) that can be applied to BFT to meet the secrecy and reconstruction requirements mentioned above. VSS generally involves dividing, by a dealer, a secret value s into N shares and distributing the shares to N shareholders in such a way that at least a threshold t shares from shareholders are required to reconstruct s. Thus, VSS can enable secret sharing in the context of BFT by having the BFT client act as the VSS dealer, having the BFT replicas act as the VSS shareholders, and setting threshold t to f+1. VSS also exhibits the property of "completion", which guarantees that at least t non-faulty shareholders will have a valid share at the end of the sharing phase so that a consistent secret value s* can be reconstructed.

One complication with incorporating VSS into a BFT protocol is that the completion property is not sufficient for ensuring liveness of the BFT protocol. In BFT, each replica is required to authenticate a client request, which a non-faulty replica cannot do until it receives a valid share of secret s. Thus, the standard completion property implies that up to f non-faulty replicas may not be able to authenticate the request and participate in the BFT protocol. This in turn means that an adversary in control of f faulty replicas can simply refuse to participate in the sequencing of the request and thereby break the liveness of the protocol.

There are certain VSS schemes that provide a stronger version of the completion property, known as "strong completion," which guarantees that the reconstruction of s will succeed with any N-f shareholders. This strong completion property overcomes the deficiency of standard completion described above and ensures liveness when VSS is used in conjunction with BFT. However, a significant drawback of existing VSS schemes that provide strong completion is that they incur, on the part of the dealer, quadratic communication and cryptographic computation overhead during the sharing phase with respect to the number of shareholders. In contrast, the communication and cryptographic computation overhead of the client in BFT protocols is linear with respect to the number of replicas. This means that incorporating an existing strong completion VSS scheme into BFT increases the client overhead by a non-constant amount, which can make this combination impractical for use in large-scale distributed systems.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure provide techniques for implementing Byzantine fault tolerance with VSS in a manner that adds constant communication and cryptographic computation overhead over traditional BFT protocols. At a high level, these techniques involve the use of a novel VSS scheme that exhibits strong completion (thereby guaranteeing BFT liveness) while allowing the dealer to (1) perform only a linear number of cryptographic computations with respect to the number of shareholders, and (2) communicate only a linear number of bits to the shareholders.

1. System Environment

Figure 1A:
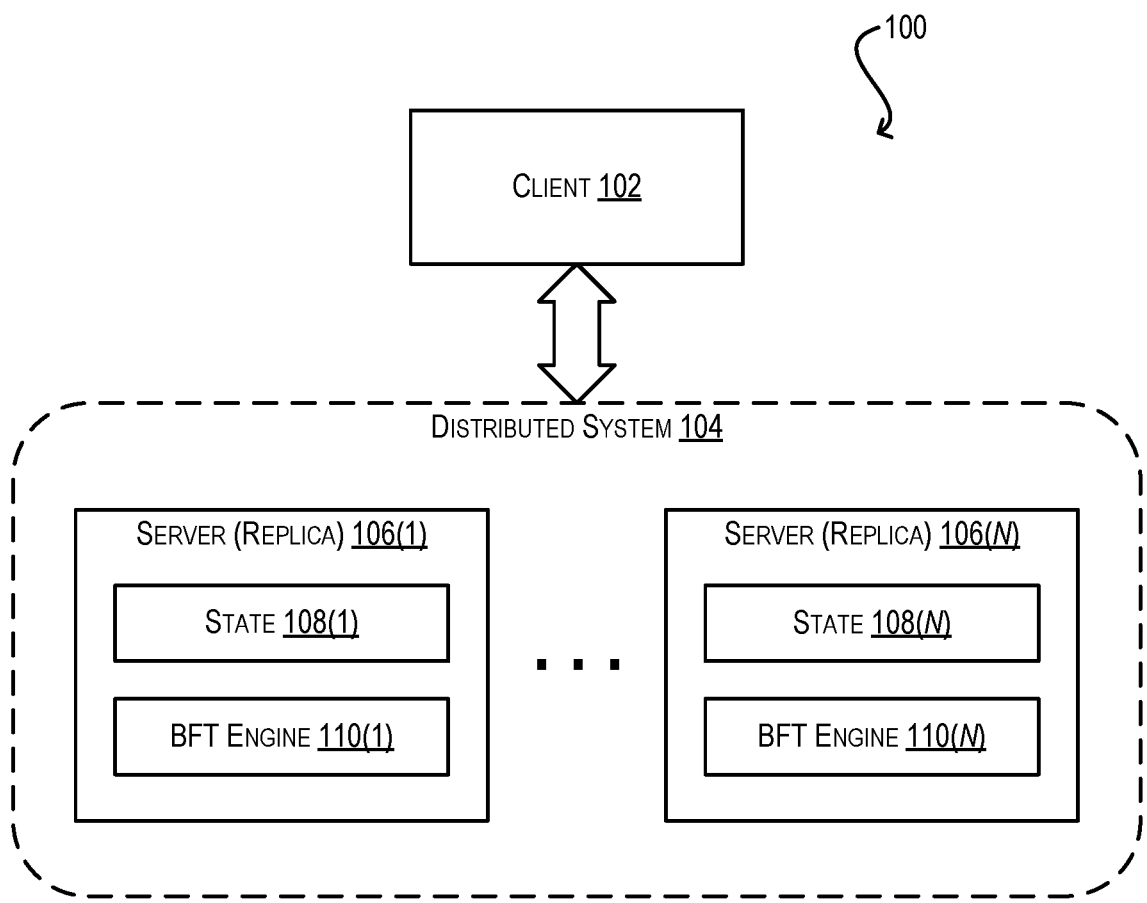
FIGS. 1A and 1B depict a system environment according to certain embodiments.

FIG. 1A is a simplified block diagram of a system environment 100 in which embodiments of the present disclosure may be implemented. As shown, system environment 100 includes a client 102 and a distributed system 104 comprising a plurality of N servers 106(1)-(N). Each server 106 may be a physical or virtual machine and is configured to run an identical instance of a replicated service (e.g., a data storage service, a blockchain service, etc.) provided by distributed system 104. Accordingly, each server 106 is referred to as a "replica" and includes replicated state 108 pertaining to its service instance. Client 102 is configured to consume the replicated service provided by distributed system 104 and thus submits, to replicas 106(1)-(N), requests to carry out service operations. Upon receiving these requests, each replica 106 executes the operations and updates its respective state 108 to reflect the results of those operations.

To ensure that replicas 106(1)-(N) sequence the execution of operations received from client 102 in a consistent fashion, distributed system 104 implements a BFT protocol via BFT engines 110(1)-(N) residing on replicas 106(1)-(N). Distributed system 104 can use any one of a number of known BFT protocols for this purpose, such as Practical BFT (PBFT) or the like. In various embodiments, it is assumed that the total number of replicas N in distributed system 104 is greater than or equal to 3f+1 (where f is the maximum allowable number of faulty replicas) and that the BFT protocol provides two guarantees: (1) if a non-faulty replica assigns a particular sequence number to an operation, then all replicas will assign the same sequence number to that operation (i.e., safety), and (2) every operation will eventually be assigned a sequence number (i.e., liveness).

Although an exhaustive discussion of how conventional BFT protocols operate is beyond the scope of this disclosure, the following is a brief outline of the processing performed by PBFT for a single instance (i.e., for handling a single client request). In this single instance, there is a fixed "primary" (which is a particular replica) and four rounds of communication:

First round: Client populates the protocol by sending its request to all replicas Second round: The primary echoes, in a PRE-PREPARE statement, the request (or a hash thereof) to the other replicas, proposing a sequence number for the request Third round: When a replica accepts the primary's proposal, the replica echoes the proposal in a PREPARE broadcast sent to all replicas Fourth round: When a replica accepts a quorum of 2f+1 PREPARE messages containing the same request or a quorum of f+1 COMMIT messages containing the same request, it broadcasts a COMMIT message to all replicas with the request; further, once a replica accepts a quorum of 2f+1 COMMIT messages containing the same request, it outputs a decision with this request As noted in the Background section, in some scenarios client 102 (or another entity) may wish to hide, from any group of f replicas, a portion of the information that client 102 submits in its requests, while at the same time allowing for reconstruction of that portion by a quorum of f+1 replicas. This is possible to achieve via VSS by having client 102 act as the VSS dealer, having replicas 106(1)-(N) act as the VSS shareholders, and setting the VSS threshold t to f+1. However, in order to maintain liveness of the BFT protocol used by distributed system 104, any VSS scheme that is incorporated into system 104 must provide strong completion, which ensures that the reconstruction of secret s will succeed with any N-f shareholders. Unfortunately, existing VSS schemes that provide strong completion incur $O(N^2)$ communication and cryptographic computation overhead on the part of the dealer, which undesirably results in a non-constant increase in client overhead when these schemes are combined with BFT.

Figure 1B:
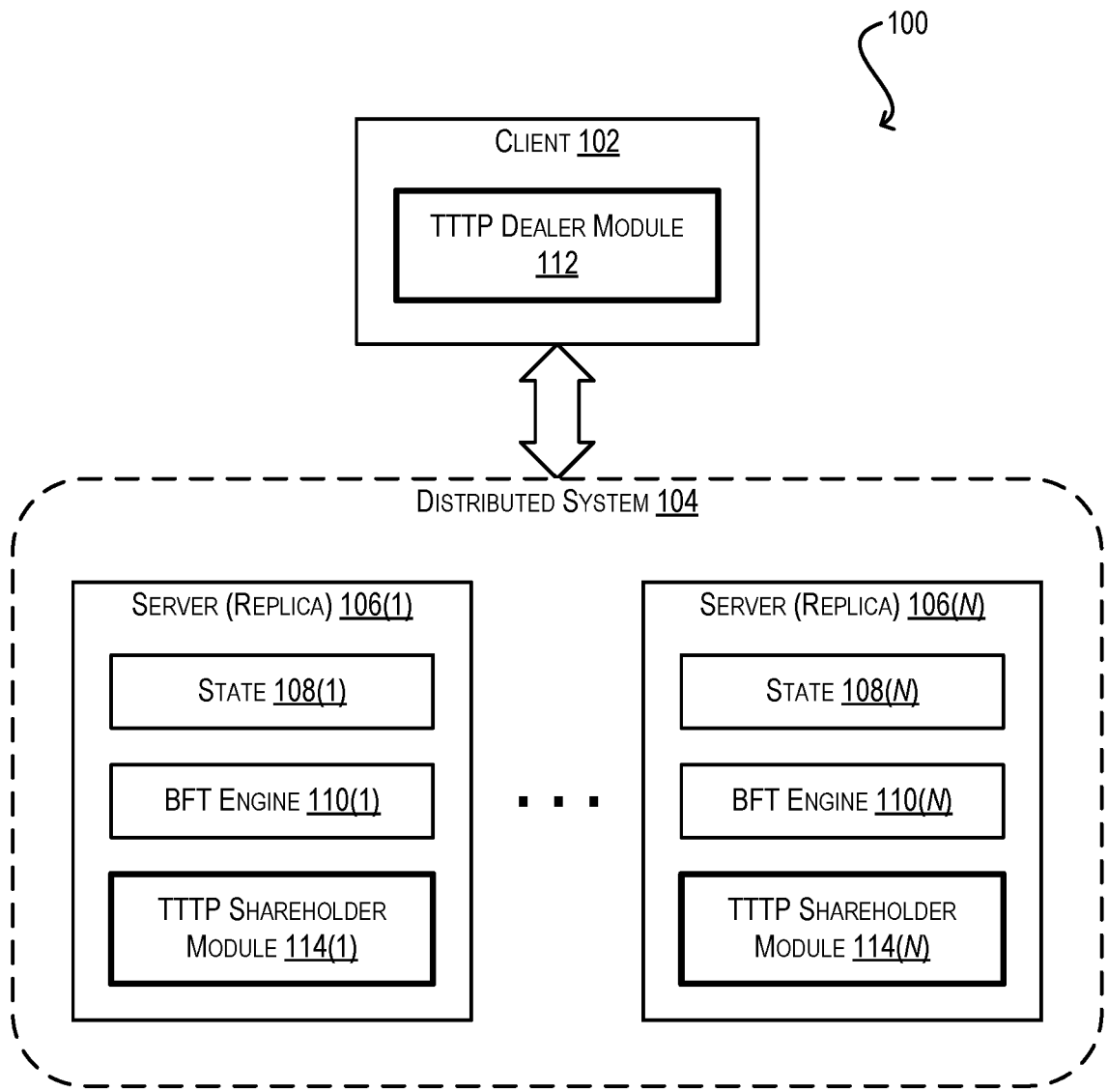

To address this and other similar issues, FIG. 1B depicts of modified version of system environment 100 that includes, within client 102 and replicas 106(1)-(N), various components (i.e., a TTTP dealer module 112 and TTTP shareholder modules 114(1)-(N)) that collectively implement a new, efficient VSS scheme referred to herein as "TTTP." Generally speaking, TTTP enables client 102 and replicas 106(1)-(N) to implement secret sharing in a manner that provides strong completion, but at the same time reduces the communication and cryptographic computation overhead of the dealer (i.e., client 102) from $O(N^2)$ (quadratic cost with respect to the number of replicas) to $O(N)$ (linear cost with respect to the number of replicas). As described in further detail below, this reduction in complexity is achieved through the use of one or more f-degree "recovery" polynomials $R(x)$ that are derived from a distributed pseudo-random function (DPRF) and that facilitate share recovery by each replica 106 (if needed). By reducing the client cost of sharing to $O(N)$ while preserving strong completion, TTTP can feasibly be combined with BFT in distributed systems that comprise a large number of replicas, since this combination results in a constant, rather than variable, increase in overhead over base BFT.

It should be appreciated that FIGS. 1A and 1B are illustrative and not intended to limit embodiments of the present disclosure. For example, the various entities shown in these figures may be organized according to different arrangements or may include subcomponents or functions that are not specifically described. Further, although FIG. 1B specifically contemplates a scenario where TTTP is used for enabling secret sharing in the context of BFT, TTTP may be broadly applied to other use cases/applications where efficient verifiable secret sharing with strong completion may be desirable (e.g., multiparty computation (MPC), etc.). One of ordinary skill in the art will recognize other variations, modifications, and alternatives.

2. TTTP Implementation

In various embodiments, TTTP can be broken down into four phases or parts: (1) setup, (2) sharing, (3) reconstruction, and (4) recovery. The setup phase can be executed once by client 102 (via TTTP dealer module 112) to determine and communicate certain TTTP parameters to replicas 106 (1)-(N) prior to the initiation of any secret sharing. The sharing phase can be executed jointly by client 102 (via TTTP dealer module 112) and replicas 106(1)-(N) (via TTTP shareholder modules 114(1)-(N)) to distribute shares of a secret value s (and other metadata) from the client to the replicas and to verify that the shares are valid. The reconstruction phase can be executed jointly by client 102 (via TTTP dealer module 112) and replicas 106(1)-(N) (via TTTP shareholder modules 114(1)-(N)) to reconstruct the value of s. And the recovery phase can be executed by replicas 106(1)-(N) (via TTTP shareholder modules 114(1)-(N)) to recover the share of a particular replica $106(i)$ without any client involvement (note that this recovery phase can be invoked from the sharing phase). Each of the foregoing phases is discussed in turn below.

2.1 Setup

Figure 2:
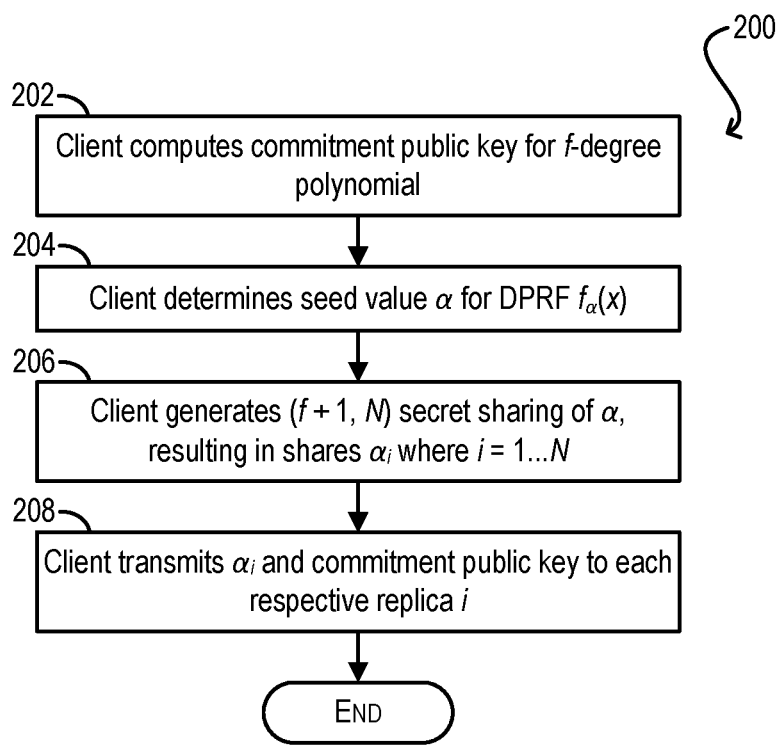
FIG. 2 depicts a VSS setup workflow according to certain embodiments.

FIG. 2 depicts a workflow 200 that can be performed by client 102 for carrying out the TTTP setup phase according to certain embodiments. Starting with block 202, client 102 can compute a commitment public key for a polynomial of degree f where f is the maximum number of faulty shareholders (i.e., replicas) in the system. This commitment public key is a parameter that will later be used during the sharing phase to generate "commitments" for the shares of secret value s that are determined by client 102 and sent to replicas 106(1)-(N), where the commitments enable the replicas or other parties to verify that the shares are valid (i.e., were derived from a consistent secret). The commitment public key is computed for an f-degree polynomial because, as explained below, client 102 will encode secret value s into such a polynomial (referred to as P(x)) for sharing purposes.

There are various existing cryptographic commitment schemes that client 102 can use to compute the commitment public key at block 202, and thus the specific nature of this computation is not described here. In a particular embodiment, client 102 may use the PolyCommit scheme described in Kate et al., "Polynomials Commitments," Center for Applied Cryptographic Research, Dec. 1, 2010 (available at cacr.uwaterloo.ca/techreports/2010/cacr2010-10.pdf), which ensures that the generated commitments have a constant size. The entire contents of this paper are included herein by reference for all purposes.

At block 204, client 102 can determine a seed value $\alpha$ for a DPRF $f_\alpha(x)$; this DPRF will later be used during the sharing phase to generate one or more recovery polynomials R(x) for facilitating share recovery by each replica 106. In one set of embodiments, the DPRF may be defined as $f_\alpha(x)=x^\alpha$. In addition, the value $\alpha$ may be determined as follows:

Generate a safe prime q
Generate an element h of order $$\frac{q-1}{2}$$

in $Z_q^*$
Define <h> to be the group generated by h
Select $\alpha \Sigma <h>$

Then, at block 206, client 102 can generate a (f+1, N) secret sharing of a (i.e., division of a into N shares such that f+1 of the shares are required to reconstruct a), resulting in shares $\alpha_i$ where i=1 . . . N. Client 102 can use any known secret sharing scheme for this this step.

Finally, at block 208, client 102 can transmit a; to each respective replica 106(i), along with the commitment public key computed at block 202, and the setup phase can end.

2.2 Sharing

Figure 3A:
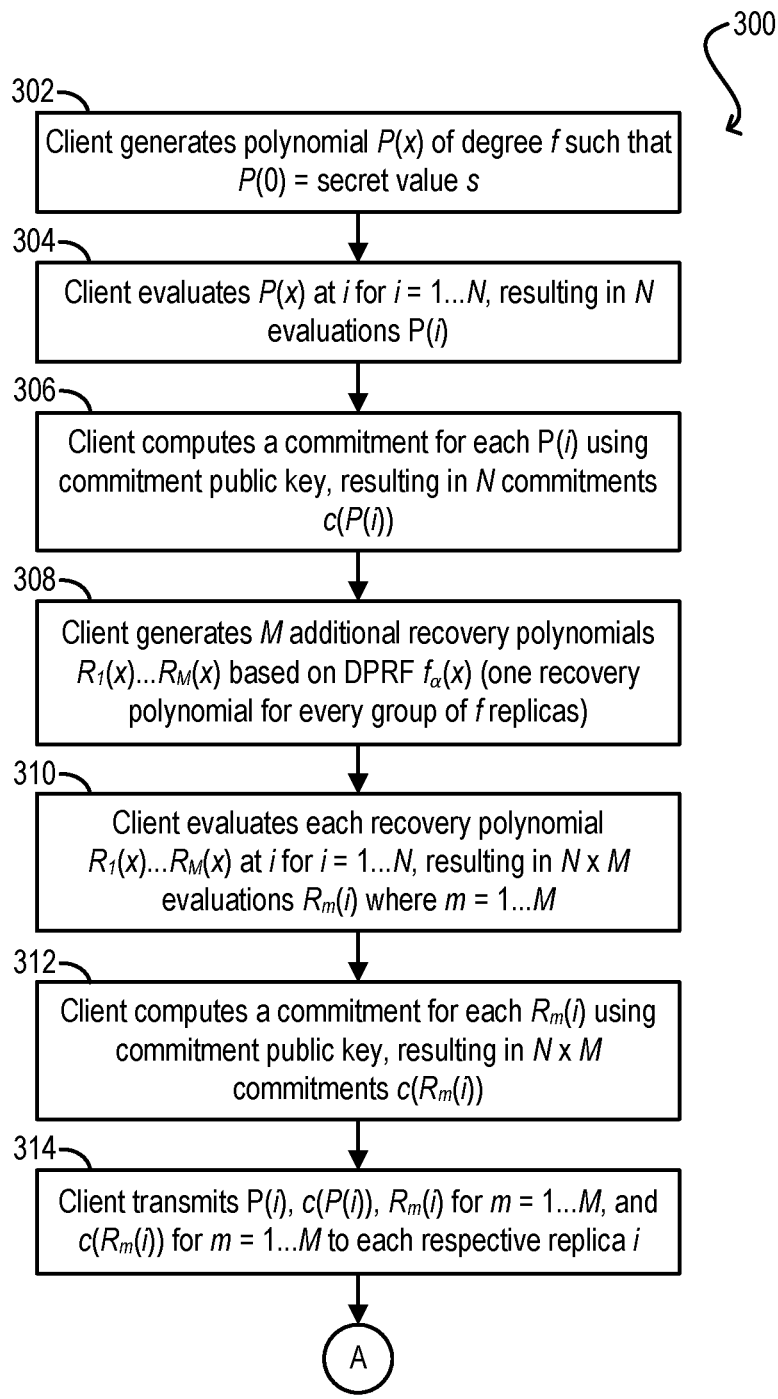
FIGS. 3A and 3B depict a VSS sharing workflow according to certain embodiments.
Figure 3B:
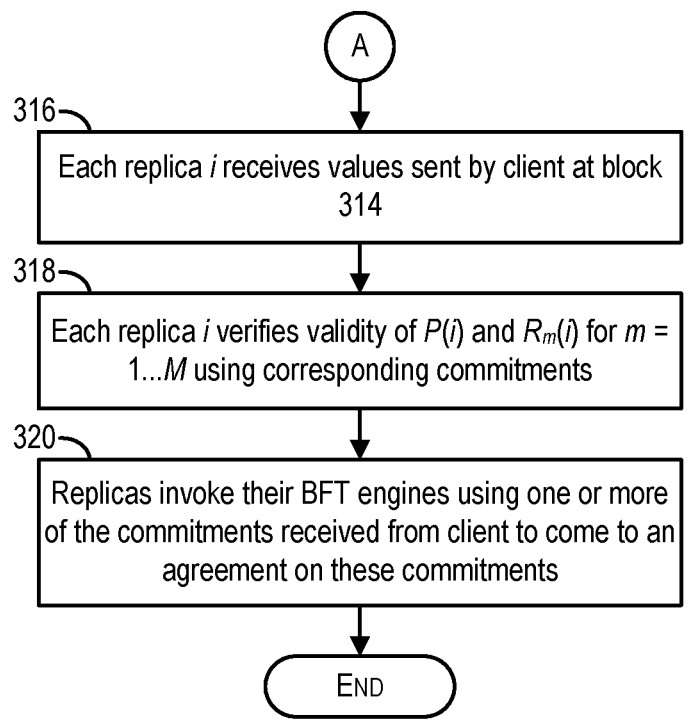

FIGS. 3A and 3B depict a workflow 300 that can be performed by client 102 and replicas 106(1)-(N) for carrying out the TTTP sharing phase according to certain embodiments. Workflow 300 assumes that the setup phase (workflow 200) has been completed and that client 102 has a secret value s (associated with a key or identifier k) that it wishes to secretly share, in accordance with threshold t=f+1, with N shareholders (i.e., replicas 106(1)-(N)). For example, s may be a private input parameter of an operation that client 102 wishes to invoke with respect to the replicated service provided by distributed system 104.

Starting with block 302 of FIG. 3A, client 102 can generate a polynomial $P(x) \in Z_q^*[x]$ of degree f such that P(0)=s. P(x) essentially encodes secret s in a manner that makes it possible to reconstruct s with knowledge of f+1 or more points on the polynomial, but makes it impossible to learn anything about s with knowledge of for fewer points.

At block 304, client 102 can evaluate P(x) at i for i=1 . . . N, resulting in N evaluations P(i). These evaluations are the shares of secret s that will be communicated to replicas 106(1)-(N). Further, at block 306, client 102 can compute a commitment for each P(i) using the commitment public key generated during the setup phase, resulting in N commitments c(P(i)). The specific nature of these commitments will vary depending on the commitment scheme used, but they generally serve as a proof that the corresponding evaluations P(i) are correct. If the Kate PolyCommit scheme is used, each commitment c(P(i)) can be comprised of two components: a first component pertaining to P(x) and a second "witness" component pertaining to the particular evaluation P(i).

Once client 102 has computed P(i) for i=1 . . . N and their corresponding commitments, client 102 can additionally generate M additional recovery polynomials $R_1(x) \ldots R_M(x)$ based on DPRF $f_\alpha(x)$ (block 308). Generally speaking, client 102 will generate one recovery polynomial for every group of f replicas in N. Thus, if N is assumed to be 3f+1 as mentioned previously, four recovery polynomials (i.e., $R_1(x), R_2(x), R_3(x),$ and $R_4(x))$ will be generated at block 308. These four polynomials can be defined as follows:

$R_1(x)=f_\alpha(i\|k)$ for i=1 . . . f
$R_2(x)=f_\alpha(i\|k)$ for i=f+1 . . . 2f
$R_3(x)=f_\alpha(i\|k)$ for i=2f+1 . . . 3f
$R_4(x)=f_\alpha(i\|k)$ for i=3f+1

At block 310, client 102 can evaluate each recovery polynomial $R_1(x) \ldots R_M(x)$ at i for i=1 . . . N, resulting in N×M evaluations $R_m(i)$ where m=1 . . . M. Further, at block 312, client 102 can compute a commitment for each $R_m(i)$ in a manner similar block 306, resulting in N×M commitments $c(R_m(i))$.

Client 102 can then transmit P(i), c(P(i)), $R_m(i)$ for m=1 . . . M, and $c(R_m(i))$ m=1 . . . M to each replica 106(i) (block 314), thereby completing the client's part in the sharing phase. In certain embodiments, client 102 may digitally sign each of these values so that the client can be held accountable if a discrepancy is later found.

Turning now to FIG. 3B, each replica 106(i) can receive the values sent by client 106 (block 316) and can verify the validity of P(i) and $R_m(i)$ for m=1 . . . Musing their corresponding commitments (block 318). If replica 106(i) has not received its share P(i) or has received an invalid share, it can invoke the recovery phase at this point to recover a valid P(i).

Finally, at block 320, replicas 106(1)-(N) can invoke their BFT engines 110(1)-(N) using one or more of the commitments received from client 102 to come to an agreement on these commitments. Once consensus is reached, the sharing phase can end.

2.3 Reconstruction

Figure 4:
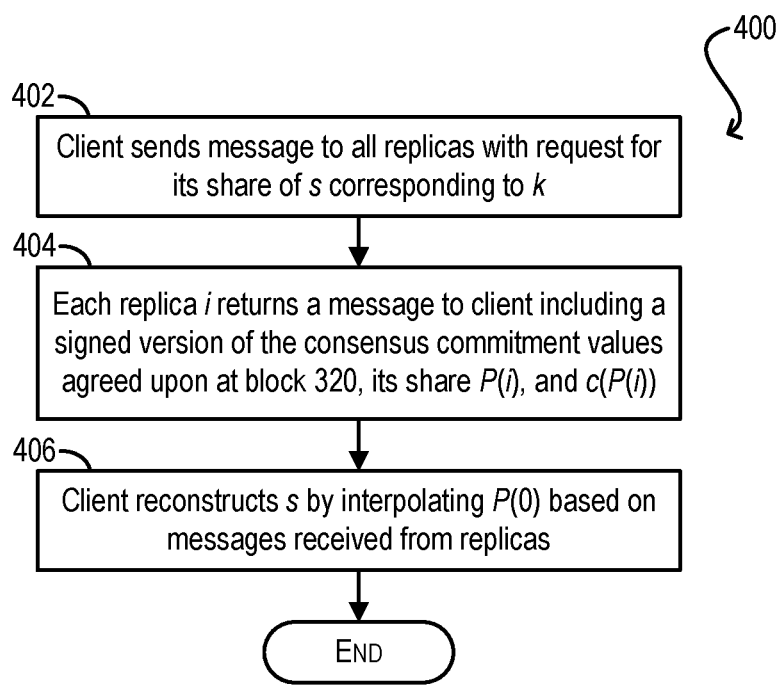
FIG. 4 depicts a VSS reconstruction workflow according to certain embodiments.

FIG. 4 depicts a workflow 400 that can be performed by client 102 and replicas 106(1)-(N) for carrying out the TTTP reconstruction phase according to certain embodiments. Workflow 400 assumes that the sharing phase (workflow 300) has been completed and that client 102 is now interested in reconstructing secret value s corresponding to key/identifier k.

Starting with block 402, client 102 can send a message to all replicas 106(1)-(N) with a request for its share of s corresponding to k.

In response, each replica 106(i) can return a message to client 102 including (1) a signed version of the consensus commitment value(s) that were agreed upon at block 320 of workflow 300, (2) share P(i), and (3) the commitment for P(i) (i.e., c(P(i)) (block 404).

The client 102 can then proceed to reconstruct s by interpolating P(0) in one of two ways (block 406). According to one approach, client 102 can wait for 2f+1 shares that all lie on the same f-degree polynomial and can interpolate P(O) from those shares.

According another approach, client 102 can verify each share based on its commitment information and, upon verifying f+1 shares, client 102 can safely interpolate P(O) from those shares.

Once client 102 has interpolated the value of P(O), the client has reconstructed the value of s and thus the reconstruction phase can end.

2.4 Recovery

Figure 5:
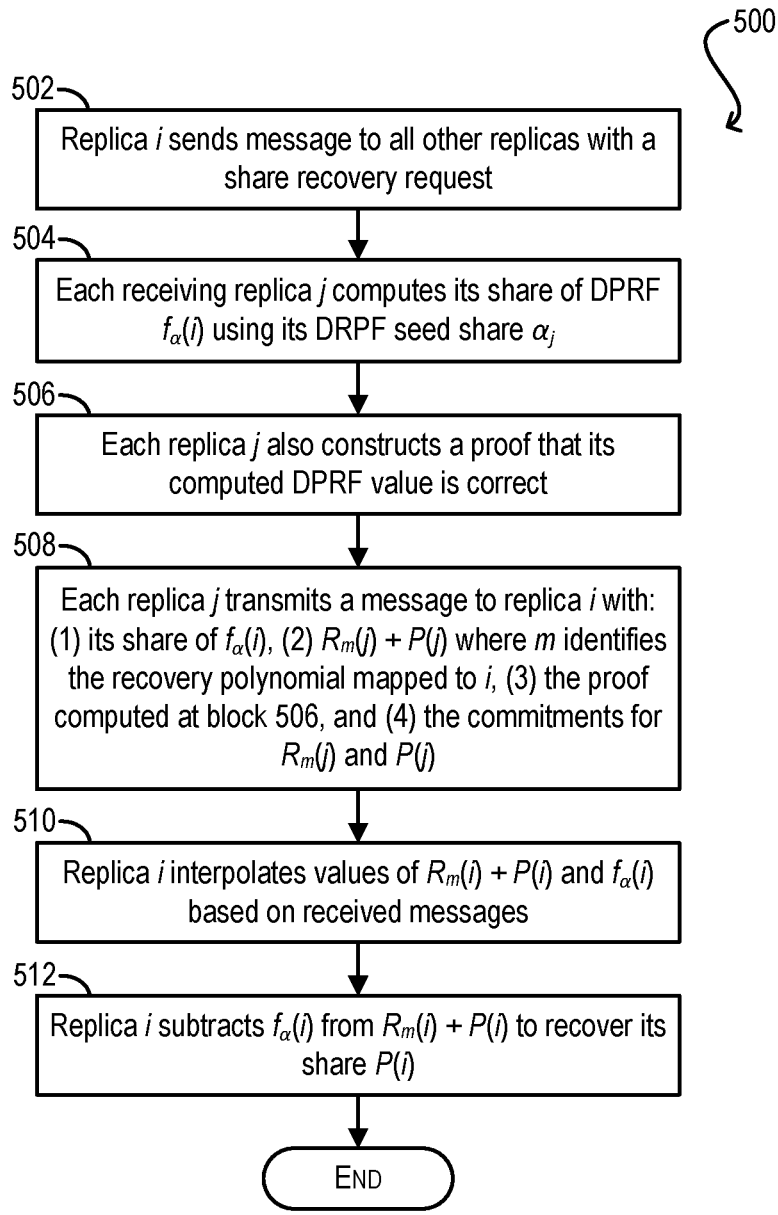
FIG. 5 depicts a VSS recovery workflow according to certain embodiments.

FIG. 5 depicts a workflow 500 that can be performed by replicas 106(1)-(N) for carrying out the TTTP recovery phase according to certain embodiments. Workflow 500 assumes that the sharing phase (workflow 300) has been initiated and that a given replica 106(i) needs to recover its share P(i).

Starting with block 502, replica 106(i) can send a message to all other replicas with a share recovery request.

In response, each receiving replica 106(j) can compute its share of DPRF $f_{\alpha_j}(i)$ using its DPRF seed share $\alpha_j$ (block 504). Replica 106(j) can also construct a proof that this DPRF value is correct (block 506). In a particular embodiment, assuming that $f_{\alpha_j}(i)$ is computed as $(i\|k)^{\alpha_j}$, this proof can show that the discrete log of $(i\|k)^{\alpha_j}$ with base $i\|k$ is the same as the discrete log of $h^{\alpha_j}$ with base h.

Then, at block 508, replica 106(j) can transmit a message to replica 106(i) with the following:
  $f_{\alpha_j}(i)$
  $R_m(j)+P(j)$ where m identifies the recovery polynomial mapped to i
  The proof that $f_{\alpha_j}(i)$ is correct
  The commitments for $R_m(j)$ and P(i), with client 102's digital signature Upon receiving these return messages, replica 106(i) can interpolate the values of $R_m(i)+P(i)$ and $f_\alpha(i)$ respectively (block 510). With respect to the former, replica 106(i) can either wait for 2f+1 shares of $R_m(x)+P(x)$ that are consistent and interpolate $R_m(i)+P(i)$ from those consistent shares, or can verify f+1 shares of $R_m(x)+P(x)$ based on the commitment information provided and interpolate $R_m(i)+P(i)$ from those verified shares. With respect to the latter, replica 106(i) can either wait for 2f+1 shares of $f_\alpha(i)$ that are consistent, or verify the proofs that were sent.

Finally, at block 512, replica 106(i) can subtract $f_\alpha(i)$ from $R_m(i)+P(i)$ in order to recover its share P(i) and the recovery phase can end.

3. Incorporating TTTP into BFT

The following is a high-level outline explaining how TTTP may be incorporated into PBFT according to certain embodiments. A similar approach may be followed for other types of BFT protocols known in the art.

Prior to first round: Client executes TTTP setup phase for communicating TTTP parameters to replicas First round: Client invokes TTTP sharing phase to send shares of its request to replicas Second round: The primary echoes, in a PRE-PREPARE statement, the TTTP commitment value(s) associated with the request to the other replicas, along with a proposed sequence number Third round: Each replica broadcasts a PREPARE message echoing the primary's proposal if the replica has a valid share from the first round; otherwise, the replica first recovers its share from the other replicas by invoking the TTTP recovery phase and then broadcasts the PREPARE message once recovery is complete Fourth round: Largely identical to conventional PBFT, however if a replica does not hold a share at this point it will recover its share using TTTP recovery; once a replica broadcasts a COMMIT message, recovery is guaranteed to succeed Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
receiving, by each replica i in N replicas of a distributed system, a message from a client, the message invoking a service operation provided by the N replicas and including:
an evaluation P(i) of a polynomial P(x) of degree f at value i, wherein f corresponds to a maximum number of faulty replicas in the N replicas, and wherein P(x) encodes a secret value s shared by the client with the N replicas; and
an evaluation R(i) of a recovery polynomial R(x) at value i, wherein R(x) is based on a distributed pseudo-random function (DPRF) $f_\alpha(x)$;
sequencing, by replica i, execution of the invoked service operation based at least in part on the received message, wherein the sequencing causes each non-faulty replica in the N replicas to assign an identical sequence number to the invoked service operation;
executing, by said each non-faulty replica, the invoked service operation in accordance with the identical sequence number; and
updating, by said each non-faulty replica, a local state of said each non-faulty replica to reflect a result of the executing of the invoked service operation.

2. The method of claim 1 wherein s corresponds to input data for the service operation.

3. The method of claim 1 wherein a different recovery polynomial is used to generate R(i) for every group of f replicas in the N replicas.

4. The method of claim 1 further comprising, prior to the receiving the message:
receiving by replica i a seed value share wherein seed value share $\alpha_i$ is generated by performing a (f+1, N) secret sharing of a seed value $\alpha$ for the DPRF $f_\alpha(x)$.

5. The method of claim 4 wherein replica i employs a Byzantine fault tolerant (BFT) protocol for carrying out the sequencing.

6. The method of claim 1 further comprising:
transmitting, by replica i, a share recovery request to every other replica j,
wherein upon receiving the share recovery request, replica j is configured to:
compute $f_{\alpha_j}(i)$ using seed value share $\alpha_j$;
compute R(j)+P(j); and
transmit a reply message comprising $f_{\alpha_j}(i)$ and R(j)+P(j) to said each replica i.

7. The method of claim 6 further comprising, upon receiving the reply messages from the other replicas:
interpolating R(i)+PQ and $f_\alpha(i)$ based on the reply messages;
subtracting $f_\alpha(i)$ from R(i)+P(i) to recover P(i).

8. A non-transitory computer readable storage medium having stored thereon program code executable by each replica i in N replicas of a distributed system, the method comprising:
receiving a message from a client, the message invoking a service operation provided by the N replicas and including:
an evaluation P(i) of a polynomial P(x) of degree f at value i, wherein f corresponds to a maximum number of faulty replicas in the N replicas, and wherein P(x) encodes a secret value s shared by the client with the N replicas; and
an evaluation R(i) of a recovery polynomial R(x) at values i, wherein R(x) is based on a distributed pseudo-random function (DPRF) $f_\alpha(x)$;
sequencing execution of the invoked service operation based at least in part on the received message, wherein the sequencing causes each non-faulty replica in the N replicas to assign an identical sequence number to the invoked service operation;
executing, by said each non-faulty replica, the invoked service operation in accordance with the identical sequence number; and
updating, by said each non-faulty replica, a local state of said each non-faulty replica to reflect a result of the executing of the invoked service operation.

9. The non-transitory computer readable storage medium of claim 8 wherein s corresponds to input data for the service operation.

10. The non-transitory computer readable storage medium of claim 8 wherein a different recovery polynomial is used to generate R(i) for every group off replicas in the N replicas.

11. The non-transitory computer readable storage medium of claim 8 wherein the method further comprises, prior to the receiving the message:
receiving a seed value share $\alpha_i$ that is generated by performing a (f+1, N) secret sharing of a seed value $\alpha$ for the DPRF $f_\alpha(x)$.

12. The non-transitory computer readable storage medium of claim 11 wherein a Byzantine fault tolerant (BFT) protocol is used for carrying out the sequencing.

13. The non-transitory computer readable storage medium of claim 8 wherein the method further comprises:
transmitting a share recovery request to every other replica j,
wherein upon receiving the share recovery request, replica j is configured to:
compute $f_{\alpha_j}(i)$ using seed value share $\alpha_j$;
compute R(j)+P(j); and
transmit a reply message comprising $f_{\alpha_j}(i)$ and R(j)+P(j) to replica i.

14. The non-transitory computer readable storage medium of claim 13 wherein the method further comprises, upon receiving the reply messages from the other replicas:
interpolating R(i)+PQ and $f_\alpha(i)$ based on the reply messages;
subtracting $f_\alpha(i)$ from R(i)+P(i) to recover P(i).

15. A replica i in a distributed system comprising N replicas, replica i comprising:
a processor;
a local state; and
a non-transitory computer readable medium having stored thereon program code that, when executed, causes the processor to:
receive a message from a client, the message invoking a service operation provided by the N replicas and including:
an evaluation P(i) of a polynomial P(x) of degree f at value i, wherein f corresponds to a maximum number of faulty replicas in the N replicas, and wherein P(x) encodes a secret value s shared by the client with the N replicas; and an evaluation R(i) of a recovery polynomial R(x) at value i, wherein R(x) is based on a distributed pseudo-random function (DPRF) $f_\alpha(x)$;

sequence execution of the invoked service operation based at least in part on the received message, wherein the sequencing causes each non-faulty replica in the N replicas to assign an identical sequence number to the invoked service operation;

execute the invoked service operation in accordance with the identical sequence number; and update the local state to reflect a result of the executing of the invoked service operation.

16. The replica i of claim 15 wherein s corresponds to input data for the service operation.

17. The replica i of claim 15 wherein a different recovery polynomial is used to generate R(i) for every group off replicas in the N replicas.

18. The replica i of claim 15 wherein the program code further causes the processor to, prior to the receiving the message:

receive a seed value share $\alpha_i$ that is generated by performing a (f+1, N) secret sharing of a seed value α for the DPRF $f_\alpha(x)$.

19. The replica i of claim 18 wherein a Byzantine fault tolerant (BFT) protocol is used for carrying out the sequencing.

20. The replica i of claim 15 wherein the program code further causes the processor to:

transmit a share recovery request to every other replica j, wherein upon receiving the share recovery request, replica j is configured to:

compute $f_{\alpha_j}(i)$ using seed value share $\alpha_j$;

compute R(j)+P(j); and transmit a reply message comprising $f_{\alpha_j}(i)$ and R(j)+P(j) to replica i.

21. The replica i of claim 20 wherein the program code further causes the processor to, upon receiving the reply messages from the other replicas:

interpolate R(i)+P(i) and $f_\alpha(i)$ based on the reply messages;

subtract $f_\alpha(i)$ from R(i)+P(i) to recover P(i).

* * * * *